United States Patent [19]

Twerdochlib

[11] Patent Number: 4,817,417
[45] Date of Patent: Apr. 4, 1989

[54] DOUBLE ECCENTRIC MOUNT

[75] Inventor: Michael Twerdochlib, Oviedo, Fla.

[73] Assignee: Westinghouse Electric Corp., Pittsburgh, Pa.

[21] Appl. No.: 46,334

[22] Filed: May 6, 1987

[51] Int. Cl.$^4$ .............................................. G01H 11/00
[52] U.S. Cl. ........................................ 73/660; 73/661; 269/71
[58] Field of Search .................... 73/660, 661, 667; 269/66, 71; 414/787

[56] References Cited

U.S. PATENT DOCUMENTS

| 2,810,880 | 10/1957 | Buccicone | 324/34 |
| 3,397,586 | 8/1968 | Crook | 74/96 |
| 3,456,184 | 1/1964 | Kopczynski | 324/34 |
| 3,493,249 | 2/1970 | Conrad, Jr. et al. | 285/39 |
| 3,600,957 | 8/1971 | Stoffel | 74/87 |
| 3,765,266 | 10/1973 | Portman | 74/571 M |
| 3,871,311 | 3/1975 | Ciecior et al. | 112/200 |
| 4,014,439 | 3/1977 | Kochsiek et al. | 269/71 |
| 4,018,083 | 4/1977 | Hoffman | 73/70 |
| 4,063,159 | 12/1977 | Haberlein | 324/260 |
| 4,066,949 | 1/1978 | Condrac | 324/262 |
| 4,367,650 | 1/1983 | Hilgner et al. | 73/649 |
| 4,423,635 | 1/1984 | Senicourt et al. | 73/593 |
| 4,495,810 | 1/1985 | Tessarzik et al. | 73/432 R |
| 4,573,358 | 3/1986 | Luongo | 73/660 |

Primary Examiner—Stewart J. Levy
Assistant Examiner—Louis M. Arana

[57] ABSTRACT

Apparatus and method for aligning and securing a blade vibration sensor about a selectable position along an inner surface of a turbomachine. The apparatus comprises a first rotatable member adapted to eccentrically secure the sensor, a second rotatable member eccentrically coupled to the first member and a ring clamp for mounting the rotatable members on the inner surface. The method includes the steps of securing the sensor to the first member, mounting the rotatable members on the inner surface, rotating the first and second members until the sensor is in a selected position and securing the first and second members against rotation.

5 Claims, 7 Drawing Sheets

DOUBLE ECCENTRIC MOUNT

FIELD OF THE INVENTION

This invention relates in general to turbomachinery and, more particularly, to an improved mounting apparatus and a method for aligning a sensing device for monitoring blade tip vibration in turbomachinery.

BACKGROUND OF THE INVENTION

Turbomachinery, such as steam and gas turbines, include a plurality of blades arranged in rows extending radially from an axially aligned shaft, the rows of blades being rotatable in response to the force of a high pressure fluid flowing axially through the machine. Due to their complex design the blades have many resonant vibrational frequencies which may be reinforced by blade rotational speeds or harmonics thereof. Blade resonant frequencies which are reinforced by rotational speeds may create stresses sufficient to break the blades and cause extensive damage. Although blades are designed and tested prior to machine installation in order to prevent resonant vibration, such evaluations performed prior to actual use do not subject the blades to the same temperature, pressure and rotational conditions which are experienced during normal operations. Consequently, it is desirable to monitor rotating blades on-line in order to detect all resonant vibrations. It is also desirable to monitor rotating blades on-line in order to detect new vibration problems which develop after a turbomachine is put in use. New blade vibrations may be indicative of significant structural changes which may also lead to extensive damage as well as costly down time while the machine undergoes repair.

Vibration monitoring systems have been developed for on-line detection of blade vibrations. A typical system may employ as many as twenty-four noncontacting proximity sensors concentrically mounted about individual blade rows. Each sensor is used to detect motion of a rotating blade tip about its normal position in a rotating time frame. Sensors are generally of the magnetic induction type which develop a small electrical output as a blade tip rotates past it. Many vibration monitoring systems measure the time required for a blade tip to travel between two reference points which are separated by a known distance. Deviations between the measured travel time of the blade tip and the expected travel time based on shaft rotational speed are calculated. The deviations are used to reconstruct a time history of vibrational movement for each blade tip. Fourier analysis is then used to determine the amplitudes and frequencies of the vibration present in each blade.

Because measurement of blade tip vibration is based on position-time data, sensor misalignment will result in distortion of the reconstructed vibration wave forms. Therefore, the vibration sensors are precision mounted to a large ring which is positioned along the turbine casing, radially outward from a blade row. In the past, the dimensions of this ring and the precision machining required for aligning the vibration sensors on the ring have formed a large part of the production and installation costs of vibration monitoring systems for turbomachinery. Furthermore, relatively small errors in the machining process may significantly affect the relative positioning of sensors and require that a machine ring be discarded. It is desirable to have a less costly means for mounting the vibration sensors which also provides for readjustment of sensor alignment. Such an adjustable mounting mechanism may also be useful for correcting sensor misalignments which result from thermal expansion and centrifugal forces during machine operation.

SUMMARY OF THE INVENTION

It is an object of the present invention to provide an improved mounting device and method for mounting vibration sensors about a rotatable blade row in a turbomachine.

It is another object of the present invention to provide an adjustable mounting device for making precision adjustments in the alignment of a vibration sensor after the sensor is mounted in the turbomachine.

It is a further object of the invention to provide a device which reduces the production and installation costs associated with precision mounting of vibration sensors in turbomachinery.

In a generalized form of the invention, there is provided an adjustable mounting device for aligning and securing a blade vibration sensor about a selectable position along an inner surface of a turbomachine adjacent at least one rotatable blade row. The device comprises a first member rotatably secured about a first axis along the turbomachine inner surface. A blade sensor is eccentrically mountable to the first member for rotation about the selectable position to define a predetermined alignment zone.

In one form the invention comprises a second member eccentrically rotatable about a second axis with respect to the first member and interposed between the first member and the turbomachine inner surface. Rotation of the first and second members provides for movement of the sensor through the alignment zone to the selectable position. The size of the alignment zone is a function of the diameters of the first and second members, the eccentricity between the two rotatable axes and the eccentricity between the geometric center of the vibration sensor and the axis of the first rotatable member. The first and second rotatable members are each securable against rotation in order to prevent movement of the vibration sensor after it is aligned.

The inventive method for aligning and securing a sensor about the selectable position includes the steps of eccentrically securing the sensor to the first member and mounting the first and second members for eccentric rotation about the inner surface of the turbomachine. The first and second members are each rotated to move the sensor through the alignment zone until the sensor is centered about the selectable position.

DETAILED DESCRIPTION OF THE INVENTION

Figure 1:
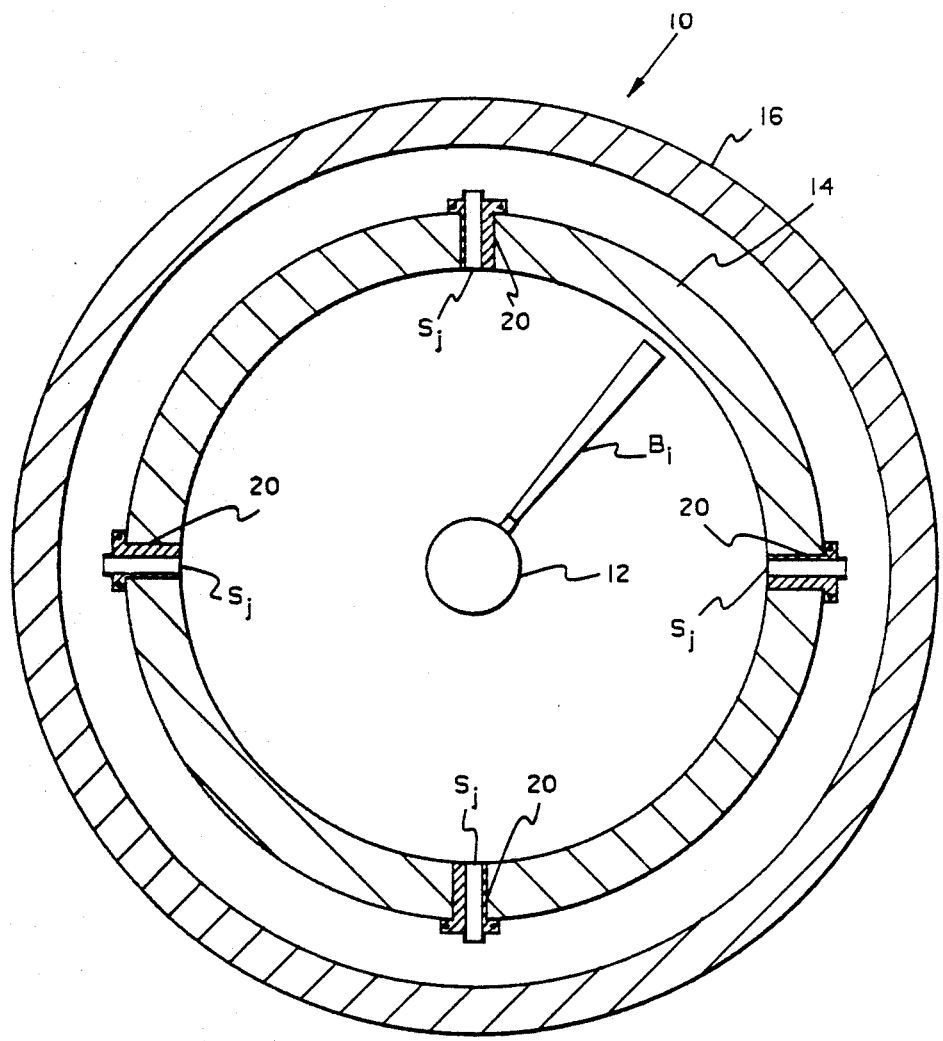
FIG. 1 is a simplified axial view in cross-section of a rotating system which incorporates the novel mounting device.

Although the invention is applicable to bladed turbomachinery generally, it is described by way of example with particular application to a steam turbine and for that purpose the rotating system of FIG. 1 may be considered a highly simplified schematic representation of a steam turbine 10. As is well known, a turbine includes a plurality of rows of blades with each row being axially spaced along a rotatable shaft. For ease of understanding, a single blade $B_i$, representative of a row of blades, is shown attached to a shaft 12 in the simplified axial view of FIG. 1. A plurality of sensors $S_j$, four of which are shown in cross-section in FIG. 1, are radially positioned about the shaft 12 on a sensor ring 14. The ring 14 provides a convenient mount for sensors $S_j$ and may be a separate element or a part of an inner surface of the turbine 10. The sensor ring 14 is concentric with the shaft 12 and is spaced inward from the turbine casing 16. Each sensor $S_j$ is secured to the ring 14 with the eccentric mounting device 20 of the present invention.

Figure 2:
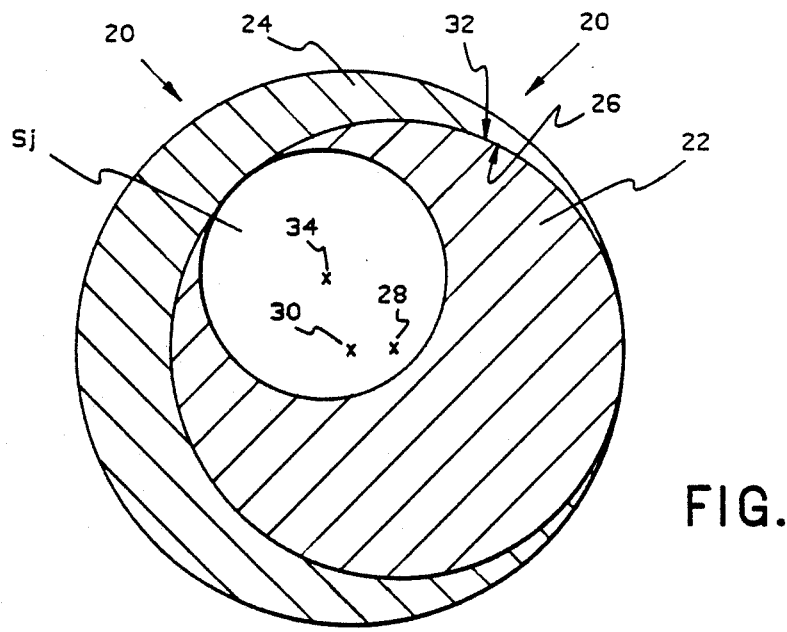
FIG. 2 is a cross-sectional plan view illustrating general features of a double eccentric mounting device constructed according to the principles of the present invention.

In one form of the invention, illustrated in the plan view of FIG. 2, a double eccentric mounting device 20, comprising rotatable first and second telescopically positioned annular members 22 and 24, provides support for a sensor $S_j$. The first rotatable member 22, defined by a first circular periphery 26, is rotatable about a first axis of symmetry 28. The second annular member 24 is rotatable about a second axis of symmetry 30 which is eccentrically aligned with respect to the first axis 28 of the first rotatable member 22, i.e., the second axis 30 is parallel to, but displaced from, the first axis 28. The second annular member 24 has an inside surface 32 which is positioned for a close fit about the first circular periphery 26 and is concentric with the first rotatable member 22.

The geometric center 34 of sensor $S_j$ is displaced with respect to the first axis 28 on the first rotatable member 22. The rotatable members 22 and 24 are recessed in the sensor ring 14 as illustrated in the partial cross-sectional view of FIG. 3 so that the geometric center 34 of the sensor $S_j$ is proximately located about a position of alignment 35 along the sensor ring 14 in order to detect movement of a rotating blade $B_i$. By way of example, when the first member 22 is rotated so that the sensor $S_j$ is repositioned as indicated by the phantom lines $S'_j$ in FIG. 4, the geometric center 34 of the sensor $S_j$ revolves about an inner circular path 36.

Figure 5:
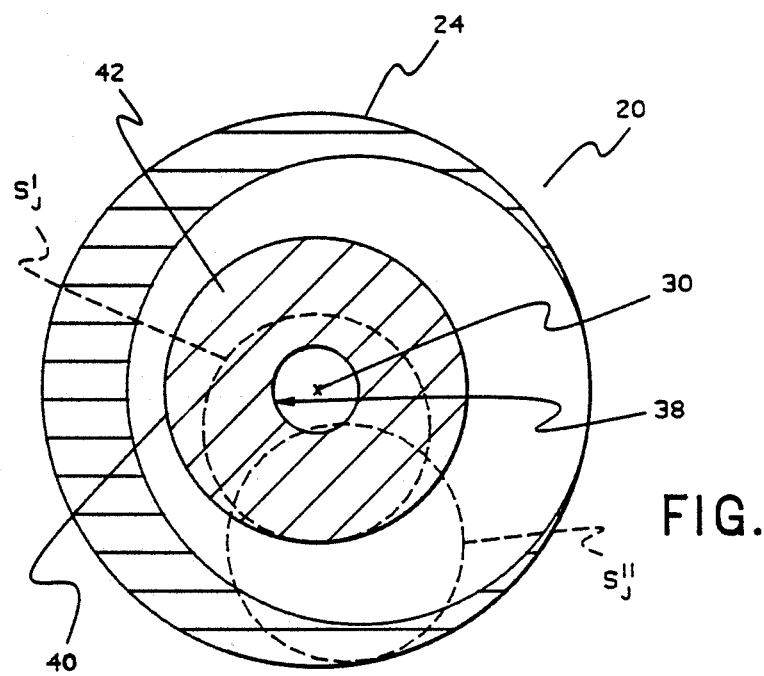
FIG. 5 illustrates a continuous sensor alignment zone for the mounting device illustrated in FIGS. 2 and 4.

When the first member 22 is stationary with respect to the second member 24 and the second member 24 is rotated, the geometric center 34 of the sensor $S_j$ revolves about one of a plurality of circular paths which are centered about the second axis 30. FIG. 5 illustrates smallest and largest paths of revolution, indicated by circles 38 and 40, which a sensor $S_j$ may travel along when the second member 24 is rotated. The particular path which the sensor $S_j$ follows during rotation of the second member 24 depends upon the rotational position of the first member 22 (not illustrated in FIG. 5) with respect to the second member 24. Phantom lines $S'_j$ illustrate the sensor positioned along the smallest path 38 and phantom lines $S''_j$ illustrate the sensor positioned along the largest path 40. Eccentric rotation of the first and second members 22 and 24 provides a continuous zone 42 for adjusting the geometric center 34 of the sensor $S_j$ about the alignment position 35 shown in FIG. 3.

In one form of the invention, the mounting device 20 comprises a first circular member 22 with a $\frac{5}{8}$ inch outside diameter, rotatable about a first axis 28, and a second circular member 24 with a $\frac{3}{4}$ inch outside diameter rotatable about a second axis 30. The first and second axes 28 and 30 are parallel to one another and spaced $\frac{1}{8}$ inch apart. With the geometric center 34 of the sensor $S_j$ mounted $\frac{1}{8}$ inch from the first axis 28, the continuous alignment zone 42 will be bounded by an essentially degenerate inner circle 38 and an outer circle 40 of $\frac{1}{4}$ inch diameter. If the mounting device 20 is positioned on the ring 14 so that the second rotatable axis 30 of the second member 24 is positioned within $\frac{1}{8}$ inch of the alignment position 35, then the alignment position 35 will be in the continuous alignment zone 42 and the geometric center 34 of the sensor $S_j$ can be rotated into the alignment position 35.

Figure 3:
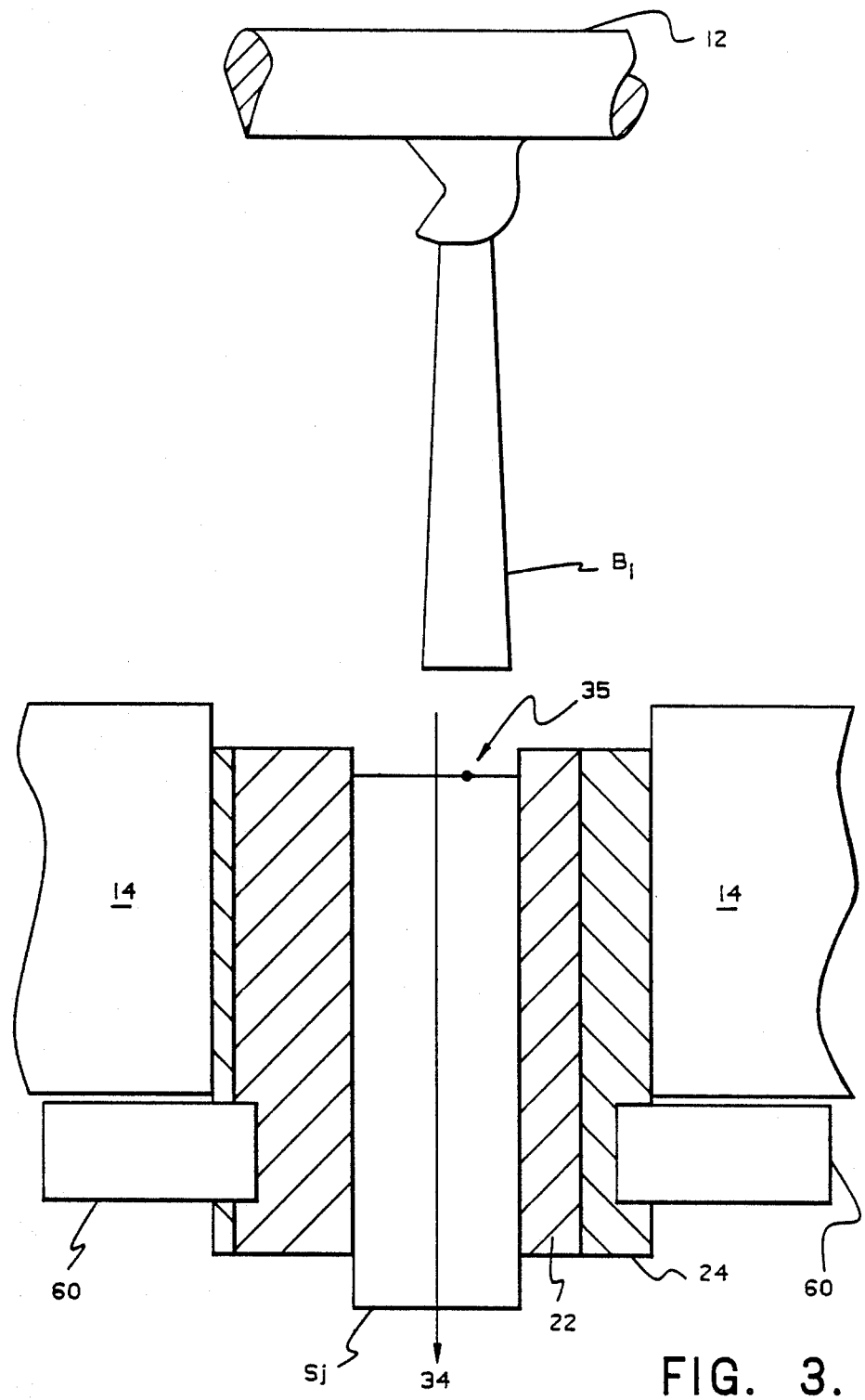
FIG. 3 is a partial cross-section, partial cutaway view transverse to the view of FIG. 1 illustrating positioning of the double eccentric mounting device of FIG. 2 along a sensor ring.
Figure 4:
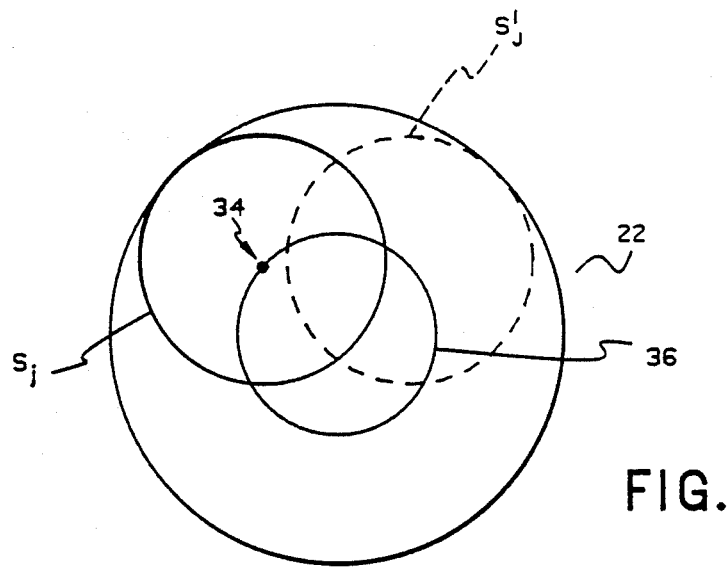
FIG. 4 is a plan view of the mounting device of FIG. 2 illustrating the effect of rotating a first annular member in order to reposition a vibration sensor.
Figure 6A:
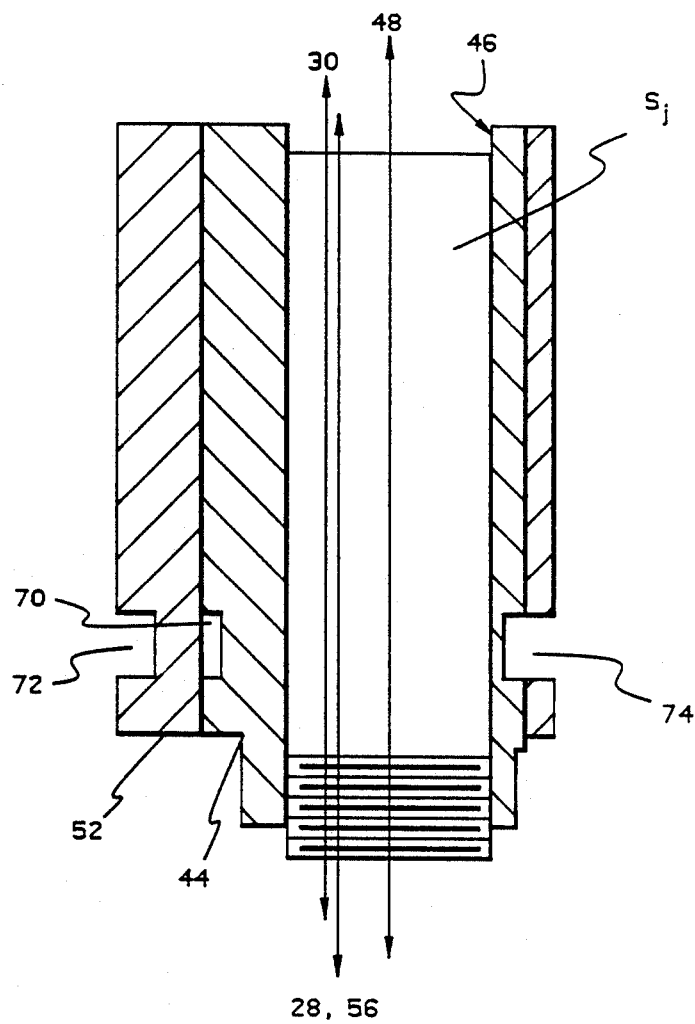
FIG. 6A is a cross-sectional view parallel to an axis of rotation of the double eccentric mounting device of FIG. 2 illustrating, in one form of the invention, inner and outer cylindrical members.
Figure 6B:
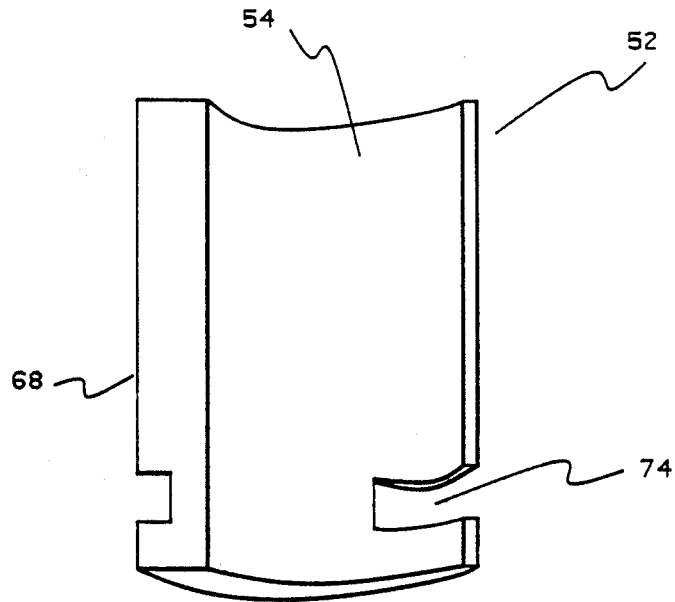
FIG. 6B is a partial perspective view in cross-section of the outer cylindrical member of FIG. 6A.

In the preferred embodiment of the invention illustrated in FIGS. 6A and 6B, the first rotatable member 22 is an inner cylinder 44 having a first axis of symmetry 28 and a first eccentric cylindrical bore 46 for securing the sensor $S_j$ to the inner cylinder 44. The cylindrically shaped sensor $S_j$ illustrated in FIG. 3 is securable in the first bore 46 with the sensor geometric center 34 (see FIG. 3) aligned with a third axis of symmetry 48 of the first bore 46. The second member 24 is an outer cylinder 52 symmetric about a second axis 30 and rotatably positioned in a close fit about the inner cylinder 44. The inner cylinder 44 is concentrically positioned within a second cylindrical bore 54 in the outer cylinder 52. The second cylindrical bore 54, illustrated in the cut away view of FIG. 6B, has a fourth axis of symmetry 56 which is substantially coaligned with the first axis 28 and eccentric with respect to the second axis of symmetry 30 of the outer cylinder 52. All of the axes of symmetry 28, 30, 48 and 56 are parallel to one another.

Figure 8:
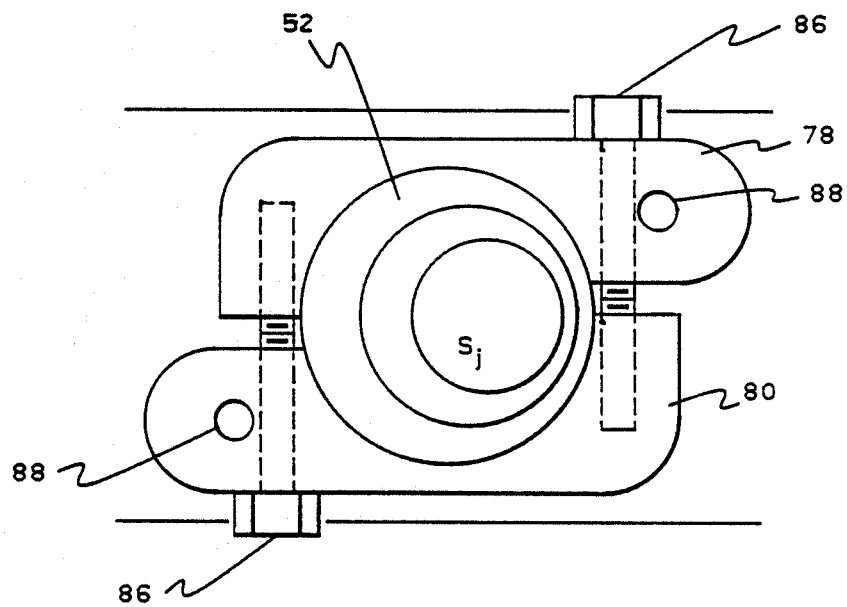
FIG. 8 is a plan view of the clamp arrangement illustrated in FIG. 7 viewed axially of the mounting device.
Figure 7:
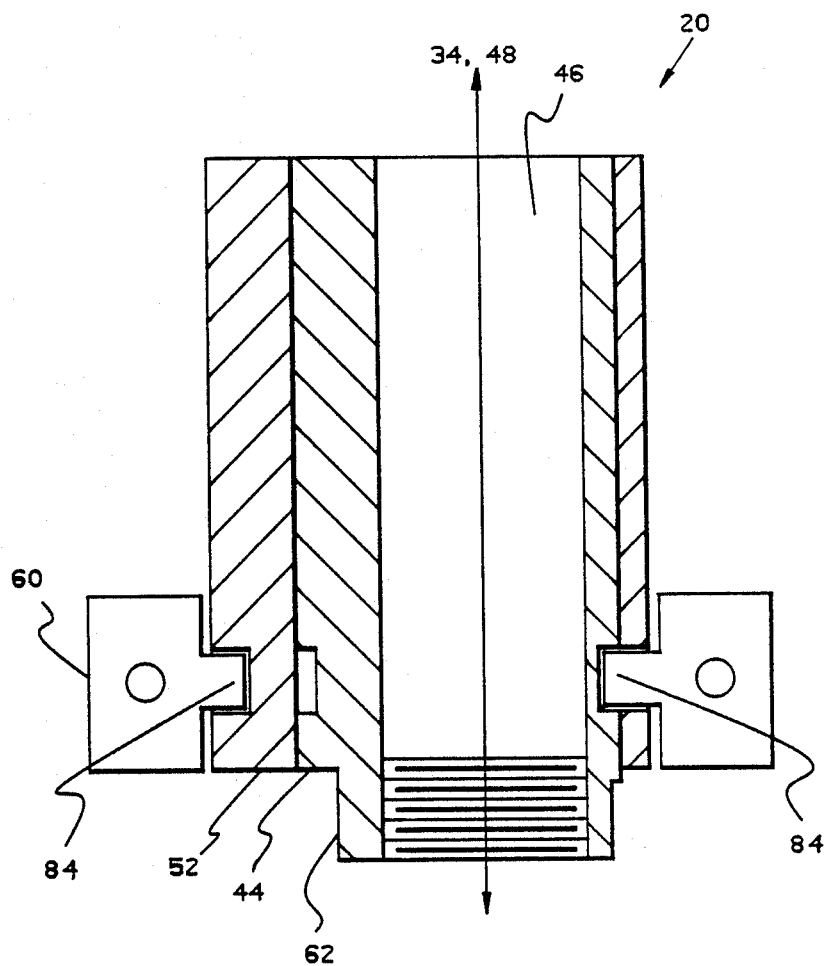
FIG. 7 is a cross-sectional view, similar to the view of FIG. 6A, illustrating a clamp arrangement for securing the double eccentric cylinders in a sensor ring.

In the preferred embodiment of the invention the mounting device 20 further comprises a clamp 60, illustrated in FIGS. 7 and 8, for attachment to the ring 14 and for securing the inner and outer cylinders 44 and 52 against rotation. In order to avoid pressure effects of the clamp 60 on the sensor $S_j$, the first bore 46 is formed substantially in a sleeve portion 62 which extends outward from the inner cylinder 44 along the third axis of symmetry 48. The sensor $S_j$ is securely threaded into the sleeve portion 62.

Figure 9:
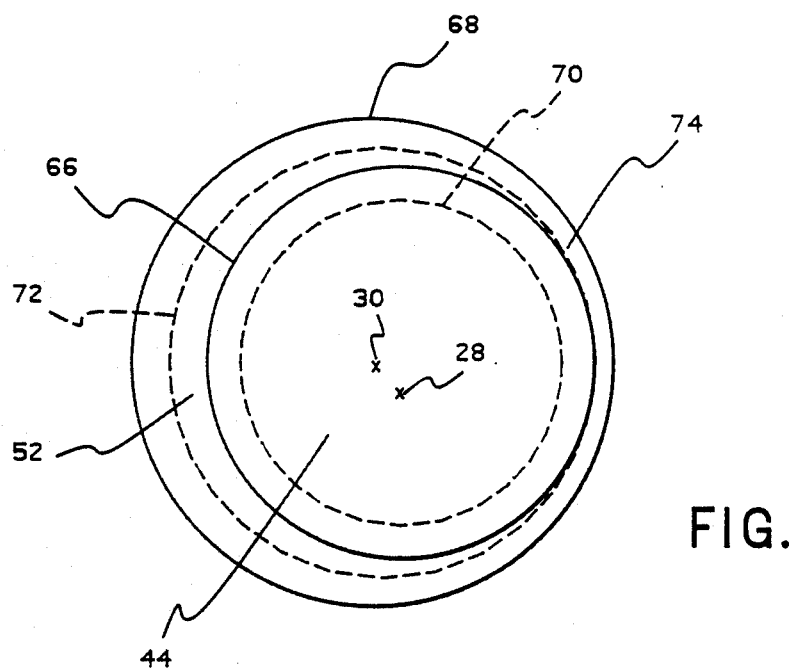
FIG. 9 is an axial view of the double eccentric cylindrical members illustrating an arrangement of clamping grooves.

Referring also to FIGS. 6 and 9, in order to clamp the mounting device 20 in place a first circular groove 70 is cut along the outer surface 66 of the inner cylinder 44, symmetrically aligned with the first axis 28. A second circular groove 72 is cut along the outer surface 68 of the outer cylinder 52, symmetrically aligned with the second axis 30. The grooves 70 and 72, represented by phantom lines in FIG. 9, are coplanar. The inner and outer cylinders 44 and 52 are so eccentrically positioned that the second circular groove 72 extends through to the second bore 54 in a region 74 where the outer surfaces 66 and 68 of the two cylinders 44 and 52 are closest to one another.

The clamp 60 comprises first and second ring portions 78 and 80 positioned about the outer cylinder 52. Each ring portion 78 and 80 comprises an annular ridge 84 positioned in the groove 72 of the outer cylinder and also positioned in a portion of the groove 70 of the inner cylinder 44 in the region 74 where the second groove 72 extends through to the outer cylinder bore 54. The ring portions 78 and 80 of the clamp 60 are connected for securing the inner and outer cylinders 44 and 52 against rotation with a first pair of bolts 86. A second pair of bolts 88 secure the ring portions to the mounting ring 14.

The method for securing the sensor $S_j$ in a selectable alignment position along the turbine casing requires mounting of the sensor $S_j$ to the inner cylinder 44 for eccentric rotation about the first axis 28. The inner and outer cylinders 44 and 52 are mounted in a close fit in the clamp 60 with the clamp ridge 84 positioned in the first and second cylinder grooves 70 and 72. The clamp 60 is then secured to the sensor mounting ring or other surface within the turbine casing 16 with the second pair of mounting bolts 88. The inner and outer cylinders 44 and 52 are then rotated about their respective axes until the sensor $S_j$ reaches a selected alignment position 35. The inner and outer cylinders 44 and 52 are then secured against rotation with respect to the turbomachine by tightening the first pair of bolts 86.

Having described a preferred embodiment of the novel mounting device 20 and a method for securing a sensor $S_j$ in a selectable alignment position 35 about a row of blades $B_i$, it is noted that the present invention, in a more general form, comprises a first sensor mounting member 22 rotatably secured about a first axis 28 along an inner surface 14 of a turbomachine 10. A blade vibration sensor $S_j$ is eccentrically securable to the first mounting member for rotation about a selectable position 35 to define a predetermined alignment zone 42 along the turbomachine inner surface 14. The invention may further comprise a second member 24, interposed between the first member 22 and the turbomachine inner surface 14 to provide continuous movement of the sensor $S_j$ through the alignment zone 42. The second member 24 may be rotatable about a second axis of symmetry 30 or otherwise translatable with respect to the first member 22. If the second member 24 is rotatable, the first member 24 is eccentrically coupled to the second member 24 so that the first axis 28 follows a circular path when the second member 24 rotates. The first and second members 22 and 24 are rotatably mounted radially outward from a row of rotatable blades $B_i$ along an inner surface, e.g., the sensor ring 14, of a turbomachine 10 in order to provide a continuous zone 42 for adjusting the sensor geometric center 34 about an alignment position. The first and second members 22 and 24 are securable against rotation after the sensor geometric center is adjusted. The apparatus for mounting the rotatable members 22 and 24 to the turbomachine 10 may comprise a clamp 60, bolts or other fastening means. The members 22 and 24 may each be secured against rotation with a clamp 60, set screw or other hardware.

The principles of the present invention having now been set forth, it will be apparent to those skilled in the art that certain modifications in structure, components and arrangements of components illustrated herein may be made in the practice of the invention or the adaptation of the invention to specific mechanical applications without departing from the spirit and scope of the invention as defined by the claims.

I claim:

1. Method for aligning and securing the geometric center of a sensor about a selectable position in a continuous alignment zone along an inner surface of a turbomachine in order to monitor the vibration in a rotatable row of blades the sensor being eccentrically securable to a first member rotatable about a first axis, the first member being eccentrically coupled to a second member which is rotatable about a second axis, rotation of the first and second members providing movement of the sensor geometric center through the continuous alignment zone, the method comprising the steps of:
   (a) securing the sensor to the first member;
   (b) mounting the second member to the inner surface of the turbomachine for rotation about the second axis;
   (c) rotating the first member about the first axis and rotating the second member about the second axis to move the geometric center of the sensor through the alignment zone until the geometric center reaches the selectable position;
   (d) securing the first member against rotation with respect to the turbomachine; and
   (e) securing the second member against rotation with respect to the turbomachine.

2. The method of claim 1 wherein the first rotatable member comprises an eccentrically mounted sleeve portion extending outward along the first axis, the first member further including a first cylindrical bore formed substantially in the sleeve portion, the step of securing the sensor including positioning the sensor within the first cylindrical bore.

3. The method of claim 1 wherein the first member comprises a first cylindrical outer surface symmetrically positioned about the first axis and the second member includes a second eccentric cylindrical bore rotatably positioned in a close fit about the first cylindrical outer surface, the step of rotating the first and second members including the steps of rotating the first member within the eccentric bore and rotating the eccentric bore about the second axis.

4. The method of claim 3 wherein the first member includes a first circular groove along the first cylindrical outer surface symmetrically positioned along the first axis and the second member comprises a second cylindrical outer surface symmetrically positioned about the second axis with a second circular groove along the second outer surface symmetrically positioned along the second axis and coplanar with the first circular groove, the step of mounting the second member to the inner surface including the steps of:
   placing the second member in a ring clamp having at least one annular ridge positionable within the second circular groove; and
   securing the ring clamp to the inner surface.

5. The method of claim 4 wherein the second circular groove extends from the outer surface of the second member into the second bore and the steps of securing the first and second members against rotation include tightening the ring clamp to press the annular ridge against the first and second members.

* * * * *